United States Patent [19]
Kondo

[11] 3,724,305
[45] Apr. 3, 1973

[54] PRECISION SHEARING METHOD
[76] Inventor: Kazuyoshi Kondo, 22-12, Hirosawa 1-chome, Hamamatsu, Japan
[22] Filed: Nov. 4, 1970
[21] Appl. No.: 86,770

[30] Foreign Application Priority Data
Nov. 15, 1969 Japan..................................44/91703

[52] U.S. Cl. ...........................83/14, 83/55, 83/621, 83/688
[51] Int. Cl. ..............................................B26d 7/08
[58] Field of Search...............83/52, 55, 688, 14, 621

[56] References Cited
UNITED STATES PATENTS
2,419,862   4/1947   Wales...................................83/55 X FOREIGN PATENTS OR APPLICATIONS
13,143   6/1901   Great Britain..........................83/688

*Primary Examiner*—Frank T. Yost
*Attorney*—Otto John Munz

[57] ABSTRACT

A precision shearing method which uses a pair of shearing die tools having contours corresponding to that of the article to be obtained, one of the tools being of a conventional design and the other tool being stepped to form clearances thereon which are positive and negative or zero with respect to said first tool, comprising urging the latter tool toward the work thereby causing first the positive clearance and then the negative clearance or zero clearance to act upon the work material.

11 Claims, 8 Drawing Figures

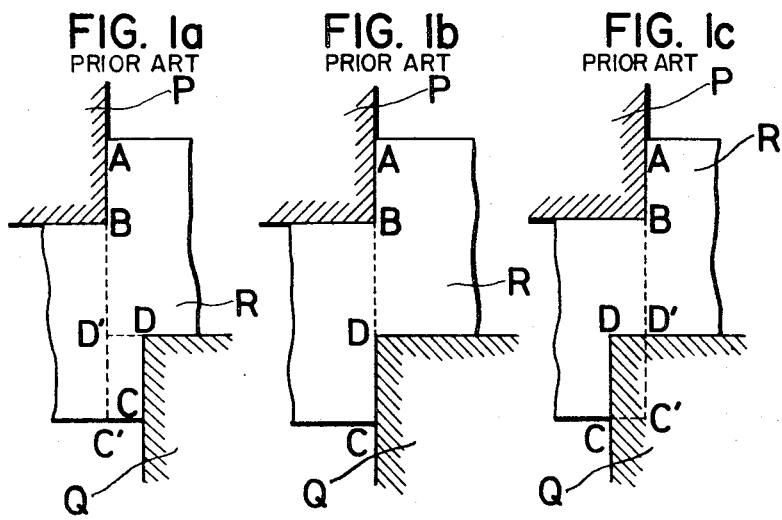
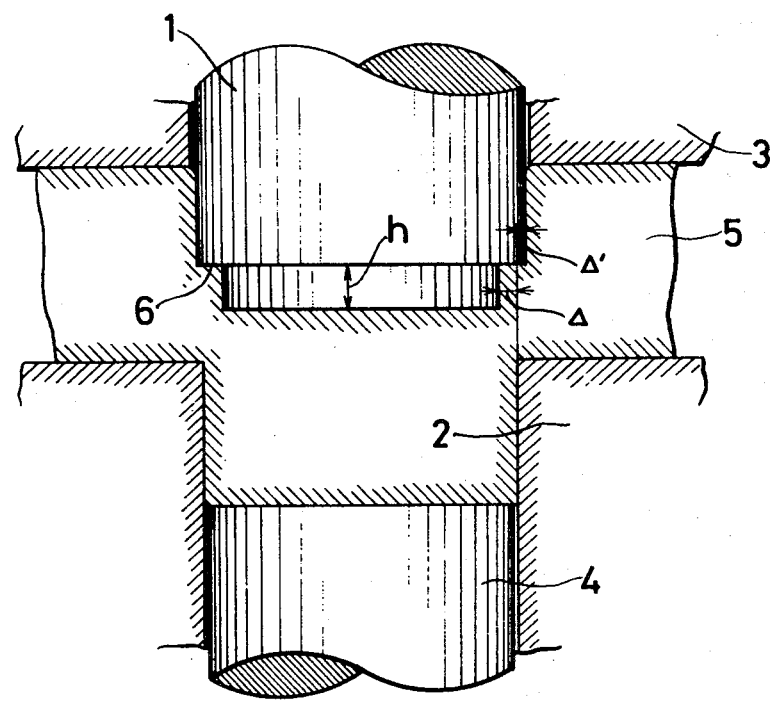

INVENTOR.
KAZUYOSHI KONDO

PRECISION SHEARING METHOD

BACKGROUND OF THE INVENTION

This invention relates to a novel precision shearing method using a punch or die of improved design.

The conventional precision shearing method in the widest use is known as fine blanking. It is based on a working principle that fracture cracking of metal can be controlled by the application of a high hydrostatic pressure upon the work portion adjacent to the tool edge. For this purpose the process calls for the use of the pressure plate with knife edge upon the work and the maintenance of a critical clearance in the range of about 0.01 to 0.02 mm between the punch and die. Such a severe clearance requirement has made the manufacture and center alignment of tools very difficult and has seriously shortened the tool life. A further drawback generally known of the fine blanking technique is the difficulties it involves in blanking materials of poor ductility, in blanking articles with sharp cornered contours, and in working thick plates.

SUMMARY OF THE INVENTION

It is an object of the present invention to provide a new precision shearing method capable of solving the problems that have been presented by fine blanking as above noted.

Another object of the invention is to provide a shearing method which uses a stepped profile tool having both a positive clearance and a zero or negative clearance in combination with an ordinary die member having the geometry of the article to be formed, and which is applicable to shearing of materials having poor ductility, to articles having sharp cornered contours, and to thick plates.

Other objects and advantages of the present invention will become apparent from the following detailed description taken in conjunction with the accompanying drawings, in which:

BRIEF DESCRIPTION OF THE DRAWING

FIGS. 1(a) to 1(c) are prior art die configurations explanatory of the reason for which the tool clearance must be minimized in the fine blanking process and also explanatory of the fundamental concept of the present invention;

FIG. 2 is a die cross section explanatory of the blanking process with a punch of improved design according to the invention;

DESCRIPTION OF THE PREFERRED EMBODIMENT

Figure 3:
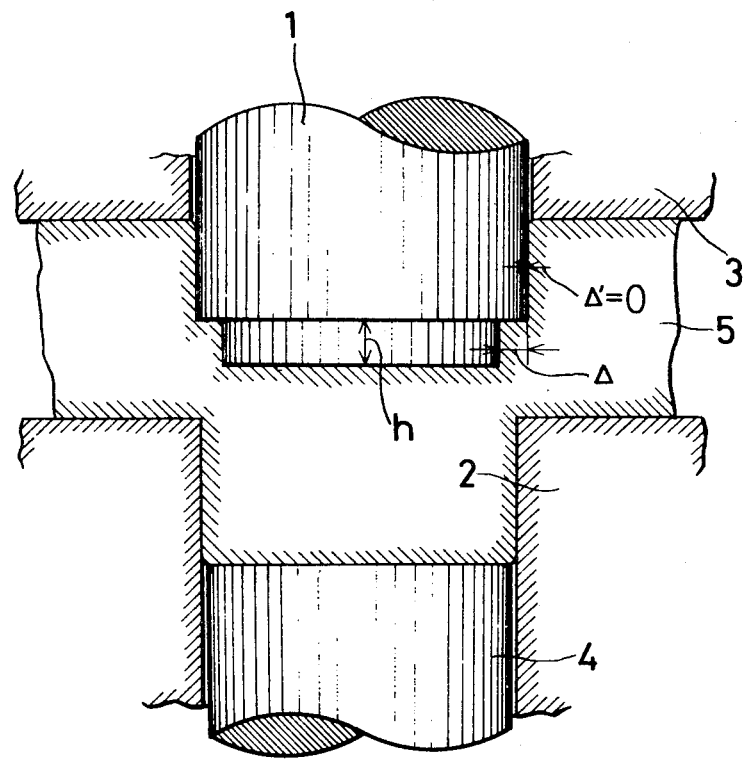
FIG. 3 is a similar die cross section explanatory of the blanking process with a punch of a modified design.

In the fine blanking process above referred to, the movement of the work along the faces of the upper and lower cutting tools, while the tools are penetrating into the work, is severely restrained by a knife edge of the pressure plate. If, therefore, a positive clearance is provided between the punch P and the die Q as shown in FIG. 1(a), the progress of the shearing process will lead to a substantial increase in the plate thickness of the work R in the clearance and hence a deficiency of material by the size defined by the points C, C', D and D' in the figure. This deficiency increases in proportion to the tool clearance and with the progress of the shearing process and also with increasing plate thickness of the work. If such a deficiency of material occurs, the field of high hydrostatic pressure produced between the two tool edges by the annular knife edge of the pressure plate biting into the work is reduced until a tensile condition is created and a fracture results. In reality chances are that the deficiency is made up for by the rounding of the work edges at A and C in the figure, but if this is not sufficient to fill up the void, fracture will take place after all.

FIG. 1(b) shows an arrangement in which the tool clearance is zero. In this case no deficiency in the volume of the work is observed. In FIG. 1(c) the clearance is negative and, in this case the work portion defined by C, C', D' and D becomes excessive with the progress of the shearing process. In order to proceed with the blanking, the excess material must be forced outwardly toward the stock side. This does not provide any relaxation to the pressure field in the shear region but rather allows the stock portion on the outside to restrain the flow of the material that is to be forced out, thus advantageously raising the hydrostatic pressure in the shear region.

According to the present invention, the punch is stepped at a certain height from the punch face to form a stepped punch portion of a reduced diameter or size and thereby provide a positive clearance between the die and the stepped portion and also a zero or negative clearance between the die and the upper punch portion of larger diameter or size, the height of the step being suitably chosen from a certain range so as to minimize the deficiency of material volume as defined by C, C', D' and D in FIG. 1(a) and prevent any fracture from being produced.

FIG. 2 shows a punch thus improved in design in conformity with the present invention as applied, for example, to the blanking of discs out of a plate. Reference numeral 1 designates the improved punch, shown at half-way of its blanking stroke. Numeral 2 is a flat die, 3 a pressure punch, 4 a counter pressure plate, and 5 the work.

The improved punch of the invention, as shown in FIG. 2, has a larger clearance $\Delta$ than does the conventional punch for fine blanking, and also has a step 6 at a height $h$ from the punch face. It is not essential for the step 6 to extend at right angles to the blanking direction, but the step may be slightly inclined with respect to the working direction. Thus, the punch portion above the step 6 has, so to speak, a negative clearance $\Delta'$. If the height $h$ is made less than the plate thickness of the work, there will be no material deficit in the process after the start of penetration of the stepped profile portion into the work. Accordingly, the occurrence of fracture cracks due to the material deficit will be avoided. In practicing the present method, it is necessary to complete the process without allowing the punch to penetrate into the die to a depth in excess of the step height $h$.

According to the method of the invention, the clearance $\Delta$ produces a fin-like burr in that space. This is an inevitable result because the clearance, at the same time, offers the advantages of easy center alignment of the tools, simplication of the tool manufacture, and prolongation of the tool life.

For a punch to be used in the practice of this invention, it is important to choose adequate values for the dimensions $\Delta$, $\Delta'$ and $h$ in FIG. 2. First, the height $h$ should be so chosen as to permit the stepped tool portion to start penetration into the work before the stage at which the die cutting edge in the course of blanking with a punch usually initiates fracture cracks of the work being blanked out. The value must, therefore, be relatively high for a work of ductile material and low for a work which lacks ductility. Because an insufficient height $h$ would make it impossible to separate the blank and stock from each other along the clearance $\Delta$, a sufficient value must be chosen for the height $h$ to enable the fin-like burr in that portion to be torn off. The clearance $\Delta$ can be chosen considerably larger than the range of 0.01 to 0.02 mm that is necessary for fine blanking, in which case, however, a correspondingly tough burr results. Taking this into account, a suitable value should be chosen in view of the easiness of deburring and the above-mentioned advantages relative to the manufacture and center alignment of the tools and the tool life. The negative clearance $\Delta'$ may be dispensed with in the scope of principle explained in connection with FIG. 1. FIG. 3 shows a punch design which provides no negative clearance $\Delta'$. For actual blanking operations some negative clearance as shown in FIG. 2 gives better results, through excessive negative clearance $\Delta'$ would increase the amount of stock to be pushed outwardly by the stepped portion, thus requiring a higher punch load.

In experiments conducted on the basis of the foregoing principle, discs 3 mm in thickness and 18 mm in diameter were blanked out. For mild aluminum plate and with $\Delta = 0.07$ mm (plate thickness ratio 2.3 percent), the blanking operation was successfully carried out with $h$ in the range of 0.5 to 1.0 mm and $\Delta'$ of 0.05 to 0.24 mm. For hard aluminum plate and with the same $\Delta$, successful blanking was accomplished with $h$ of 0.5 and $\Delta'$ of 0.05 to 0.24 mm. Experiments were also made on 6 mm-thick SPHC(hot-rolled steel plate) for blanking out discs 30 mm in diameter. With a constant $h$ value of 0.6 mm, three different values of 0.75 mm, 0.5 mm and 0.3 mm were combined with three different $\Delta'$ values of 0.25 mm, 0.12 mm and 0.07 mm. All of the nine cases gave satisfactory results. Throughout these experiments the pressure plate needed no annular knife edge, and the pressure plate and counter pressure punch were required to exert only sufficient force to avoid warping and lifting-off. Thus in these respects, too, the present method is advantageous over the fine blanking method known in the art.

Figure 4:
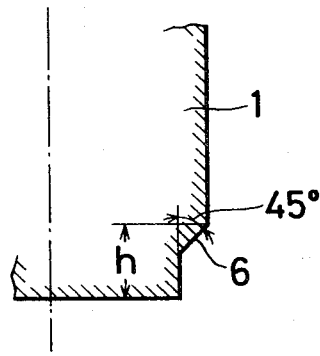
FIG. 4 is a partial cross section of a punch of a further modified design.

The stepped profile portions of the tools used in the foregoing experiments were finished exactly at right angles to the blanking direction as at 6 in FIG. 2. Similar blanking experiments were conducted on the same hot-rolled steel plate, using a punch 1 having a 45° taper along the underside of the step 6, as shown in FIG. 4, instead of the tools employed in the preceding experiments. The results clearly indicated that only if the width of the work and the width of the burr which is left after blanking are slightly larger than when the tools with right-angled steps are used, but successful blanking is accomplished without modifying the other conditions. This means that there is a certain latitude in choosing the contour of the underside of the step 6, and suggests the ease with which the stepped profile tools are manufactured and maintained.

Since the working principle of the shearing method according to this invention resides in the provision of smooth sheared surfaces through elimination of the volume deficiency above described, it is considered theoretically possible to apply the present method to thicker plates without difficulty. When the present method is put into practice adopting larger values of $\Delta$, a tough burr may be formed and may render it difficult to separate the blank and stock completely from each other. If such is the case, the complete separation can be accomplished simply with the use of other stations arranged in a progressive die. Such an arrangement can rather advantageously be utilized as means to eject the blanket articles.

Figure 5:
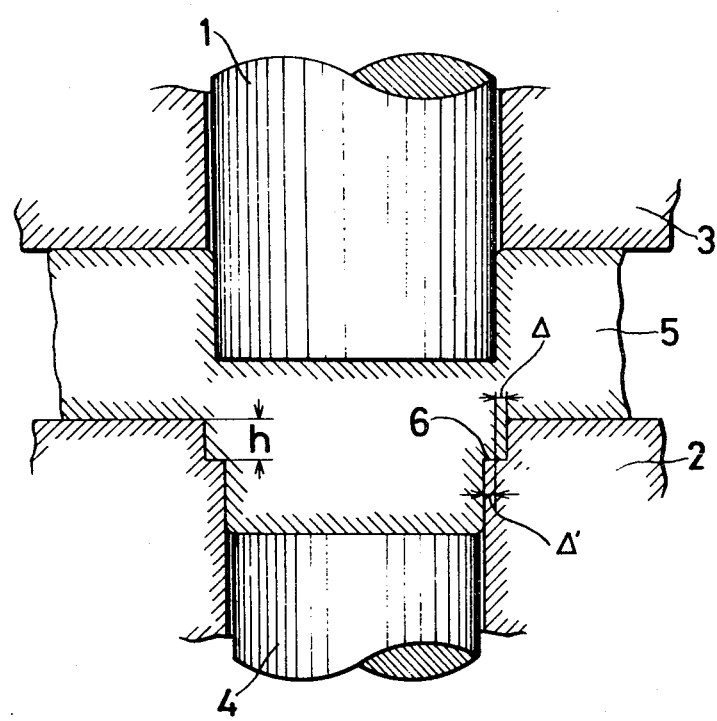
FIG. 5 is another die cross section explanatory of the punching process in accordance with this invention.

Although the method of the invention has been described in connection with blanking operations, the principle of the present invention is applicable to punching as well, provided that the die 2 is stepped as at 6 in FIG. 5. In the figure, $h$ represents the height of the step 6, $\Delta$ represents a positive clearance, and $\Delta'$ a negative clearance. Reference numerals designate like parts as in FIG. 2.

Figure 6:
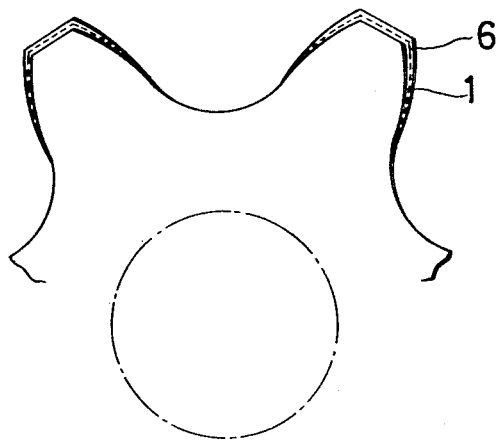
FIG. 6 is a plan view of a tool which has a stepped profile only at the sharp cornered and convex portions which minimizes fracture cracking of the work.

This arrangement may be suitably combined with a pressure plate with a knife edge and/or a rounded tool edge which are used in fine blanking, in applications where any such combinations may give better results. Further, the step 6 need not be provided on the tool along the entire contour of the article to be obtained, but it may be selectively provided along the sharp cornered convex parts where fracture cracks may easily develop. FIG. 6 shows the bottom of a punch for the blanking of sprocket wheels. The broken lines represent the contour of the die (that is, the contour of the article to be obtained), numeral 1 indicates the punch and 6 indicates its step. It will be seen that the step 6 is formed only at the sharp cornered convex parts most liable to cause fracture cracking.

I claim:

1. A precision shearing method for the cutting of parts in a punch and die tool comprising the steps of:
    compressing in the tool at least the marginal area of the stock which is to be removed from the part to be produced;
    advancing a primary cutting edge in relative motion against an opposing precision cutting edge with a circumferential clearance therebetween, whereby the precision cutting edge creates the sheared surface on the part;
    advancing simultaneously against the same precision cutting edge a secondary cutting edge which is radially and axially offset relative to the primary cutting edge so as to present no circumferential clearance to the precision cutting edge and to be axially more distant from it from the primary cutting edge; and terminating the relative advance of the primary and secondary cutting edges against the opposing precision cutting edge, as soon as the secondary cutting edge is positioned in near proximity to the precision cutting edge, while the primary cutting edge axially overlaps the same.

2. A method as defined in claim 1, wherein the steps of advancing a primary and secondary cutting edge against an opposing precision cutting edge involve an axial succession of the primary and secondary cutting edges which is so spaced in relation to the ductility and thickness of the stock that compression is maintained in the shear region.

3. A method as defined in claim 2, wherein the step of advancing a secondary cutting edge involves a cutting edge which presents a circumferential overlap or negative clearance to the opposing precision cutting edge.

4. A method as defined in claim 2, further comprising the step of compressing in the tool at least the margin of that stock area which is to become the part.

5. A precision shearing tool for blanking and/or punching operations in the production of parts, comprising in combination:

a die tool;

a guided punch tool which moves relative to and in alignment with the die; and means for compressing the stock of the part in the region of intended shearing;

the die and punch tools cooperating with one another to form three opposing cutting edges: a precision cutting edge on the one tool which is to create the precision-sheared surface on the part, and a primary and secondary cutting edges on the opposing tool which are so arranged that the primary cutting edge moves with a circumferential clearance relative to the precision cutting edge and the secondary cutting edge moves without circumferential clearance relative thereto, the secondary cutting edge being axially recessed from the primary cutting edge in relation to the opposing precision cutting edge.

6. A tool as defined in claim 5, wherein the secondary cutting edge on the opposing tool is so arranged that it and the precision cutting edge move with a circumferential overlap or negative clearance relative to one another.

7. A tool as defined in claim 5, wherein the primary and secondary cutting edges are part of a cross sectional tool configuration which includes a first peripheral face at a right angle to the cutting plane defined by the primary cutting edge, an axially recessed shoulder, and a second peripheral face which represents the periphery of the tool itself.

8. A tool as defined in claim 7, wherein the axially recessed shoulder of the tool configuration presents a face which is parallel to the cutting plane.

9. A tool as defined in claim 5, wherein:

the tool is a socalled blanking tool which creates the outer contour of a part by cutting it out of flat stock, and wherein:

the die tool carries the precision cutting edge and the punch tool carries the primary and secondary cutting edge.

10. A tool as defined in claim 9, wherein the blanking tool is designed to cut a part whose contour includes concave curvature portions; and the punch tool which carries the primary and secondary cutting edges has the secondary cutting edge omitted in the concave curvature portions.

11. A tool as defined in claim 5, wherein:

the tool is a socalled piercing tool which creates an inner contour in a part by punching out a portion of the stock, and wherein:

the punch tool carries the precision cutting edge and the die tool carries the primary and secondary cutting edges.

* * * * *